INVENTOR.
P. Dhondt

United States Patent Office 3,398,555
Patented Aug. 27, 1968

3,398,555
DAMPING DEVICE FOR THE FRICTION BOX
OF A KNITTING MACHINE
Prosper Dhondt, Wondelgem, Belgium, assignor to
Fabrique National d'Armes de Guerre, Societe
Anonyme, Herstal, near Liege, Belgium
Filed Oct. 21, 1965, Ser. No. 500,402
Claims priority, application Belgium, Sept. 14, 1965,
669,574
5 Claims. (Cl. 66—130)

ABSTRACT OF THE DISCLOSURE

A damping device for the friction box of a knitting machine, wherein the friction box carried by a friction rod is alternately braked and stopped by two angularly movable stops. The motion of these stops is imparted by a cam driven at the same speed and in the same direction as the friction rod.

This invention concerns an improved damping device for the friction box of knitting machines of the type in which the slurcams and the carrier rods are driven from a sinking cam by a friction rod moving to-and-fro in a straight line. In such kinds of machines, it is essential to retain the lead of the active yarn guides relative to the slurcams, which involves the necessity of introducing a relative motion between said slurcams and said yarn guides at the end of formation of each row of stitches. To this end, it is well known to provide a friction box which normally is driven by the friction rod but the displacements of which can be limited with respect to the latter by appropriately arranged stops. The yarn guides being driven by way of said friction box, it is thus possible to obtain said relative motions between yarn guides and slurcams at the end of each row of stitches.

The problem concerning the damping and the immobilization of the friction box in these extreme positions thus requires particular attention, all the more so since the damping and immobilization means must take into account the eventual narrowings and widenings during the knitting.

The object of the present invention is to provide a damping device for the friction box, which is extremely efficient and automatically adapted to the number of stitches formed for each row of the panels of knitted fabric made.

For this purpose, the new damping device, intended for being mounted in a machine of the type described above, substantially consists of two mobile stops engaged respectively by said friction box when the latter reaches either of its extreme positions, the displacements of such mobile stops being positively controlled by the activating mechanism of said friction rod and comprising a damping phase and an immobilization phase, whereby the distance between aforesaid stops is adjustable from the main cam shaft of the frame.

In order to bring out with additional clearness the characteristic features of the present invention, an embodiment of the latter is described below by way of illustration, with reference to the appended drawings of which:

Figure 1:
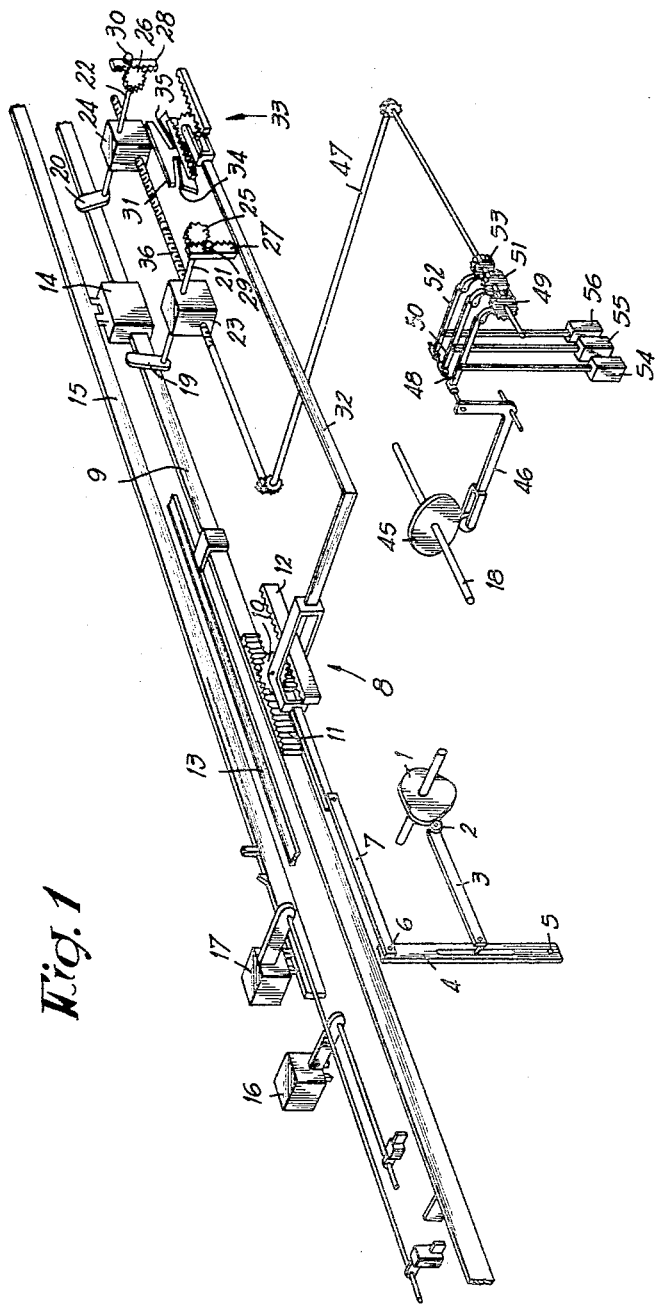
FIGURE 1 is a diagrammatic perspective view of the mechanism of which the device according to the present invention is a part.
Figure 2:
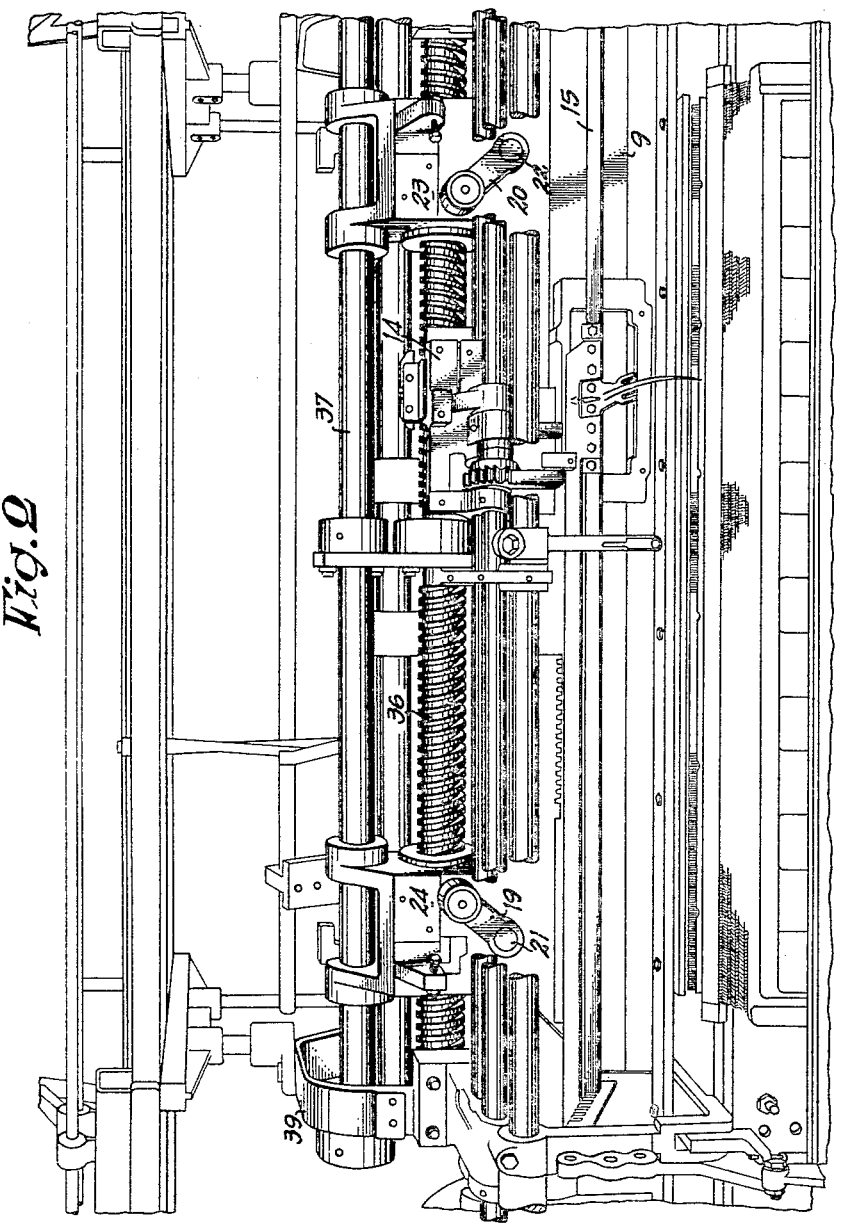
FIGURE 2 is a partial front view of the device according to the present invention.

The mechanism by which the device according to the present invention is to be integrated in a knitting machine, as clearly illustrated in FIGURE 1, comprises the sinking cam 1 of the machine, driven from the main camshaft of the machine. The follower of this cam 1 is a roller 2 of a slider 3, the other end of which pivots on a beam 4, the lower end 5 of the latter itself pivots on a fixed part of the machine frame. The pivoting point of the slider 3 on the beam 4 is adjustable in height so as to make it possible to change the angular motion of the latter.

The upper end 6 of beam 4 drives a rod 7 which, by means of a step-up device 8, drives the friction rod 9. Said device 8, of a type well known as such, consists of a pinion 10 rotating at the end of said rod 7, engaging two opposite racks 11 and 12, respectively, one of which is fastened to the aforesaid friction rod 9, while the other one is fastened to a fixed part of the machine.

The friction rod 9 drives the slurcam 13 and carries a friction box 14 which in turn drives one or the other of a series of carrier-rods of which only one is represented at 15.

The aforesaid mechanism comprises moreover two selvedge blocks 16 and 17 of which the spacing apart is controlled from the main camshaft 18 of the machine.

The device conforming to the present invention comprises two mobile stops 19 and 20, respectively, designed for coming alternately into contact with the friction box 14. Each one of said stops 19 and 20 is carried by a shaft, 21 and 22, respectively, pivotally mounted in a support, 23 and 24, respectively. The other ends of these shafts carry pinions 25 and 26, respectively, engaging vertical racks, 27 and 28, respectively. These racks carry loose rollers 29 and 30, respectively.

A cam 31, driven in a reciprocating linear motion by the aforesaid rod 7 through a connection 32 and a step-up device 33, is intended for alternately engaging said rollers 29 and 30, for which purpose cam 31 is provided with two slanting grooves 34 and 35, respectively.

The supports 23 and 24 are mounted on a common threaded rod 36 the rotation of which, controlled by a mechanism which shall be described hereinafter, adjusts the spacing apart of the blocks in question and hence of the stops 19 and 20 according to the width between the selvedges of the knitted fabric to be made and the narrowing and widening of stitches controlled by the patterning device of the machine.

Figure 3:
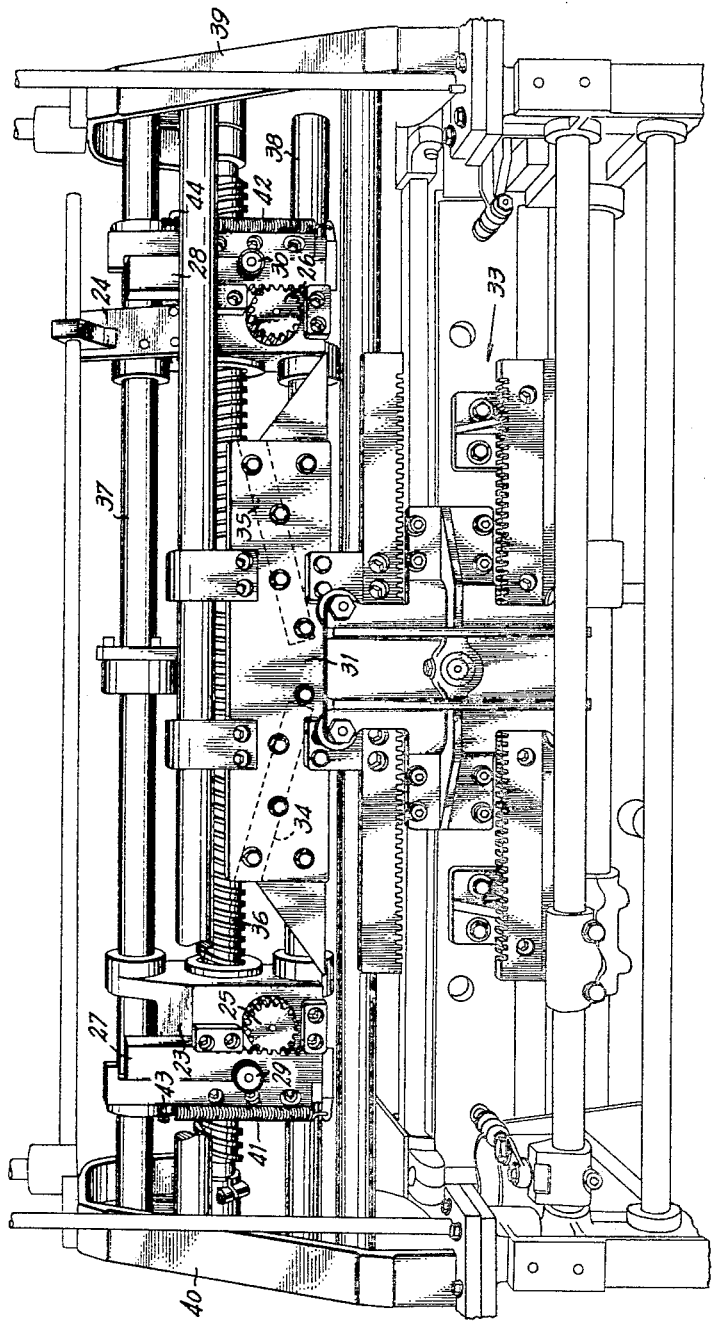
FIGURE 3 is a rear view of the device according to FIGURE 2.

As illustrated in FIGURE 3, the supports 23 and 24 are guided by two guiding bars 37 and 38 which go right through them and are supported at their ends by two uprights 39 and 40 of the machine frame. The racks 27 and 28 are pulled back into their high position by means of springs 41 and 42 respectively, the upper ends of which are fastened to studs 43 and 44 respectively, provided for this purpose on said supports 23 and 24.

The spacing apart between the supports, 23 and 24, respectively, between the stops 19 and 20 is controlled on the one hand, by a cam 45 mounted on said shaft 18, which cam controls the rotation of the threaded rod 36 in the required sense via the bell crank level 46 and a connection diagrammatically referred to as 47, appropriate means being provided for the narrowing by four and by two needles, as well as for the widening by one needle. These means mainly consist of the ratchet levers and wheels 48, 49, 50, 51, 52, 53, respectively. The levers 48, 50 and 52 are controlled by electromagnets, 54, 55 and 56, respectively, which in turn are controlled by the patterning mechanism of the machine.

The damping device according to the present invention operates in the following manner. The friction rod 9 and the cam 31 are driven simultaneously at equal speed and in the same sense from the sinking cam 1 via the connection 2 through 7 and the step-up devices 8 and 33. Because of the adjustment of the spacing between blocks 23 and 24, the stops 19 and 20 come alternately in the path of the friction box 14 carried by the friction bar 9. At the moment when the box 14 is going to come into contact with either of said stops, such as stop 20 for instance, the groove 35 of the cam 31 engages the roller 30 and imparts a downward linear motion to the rack 28. This linear motion imparts, via pinion 26 and shaft 22, an angular motion to the stop 20 which thus gradually acts as a brake on box 14 until the latter has come to a complete standstill.

The variation of the retardation imparted to the box 14 by either one or the other of the stops 19 and 20 is of course dependent on the slope given to the grooves 34 and 35 of the cam 31. It will, for instance, be possible to select a curved profile designed for providing a maximum deceleration at the start of the damping. On the other hand, very satisfactory results can be obtained by straight-line profiles of which the slope angle is comprised between 30° and 50°, for example. As is apparent from the drawings, cam 31 has an anchor-like profile.

Figure 4:
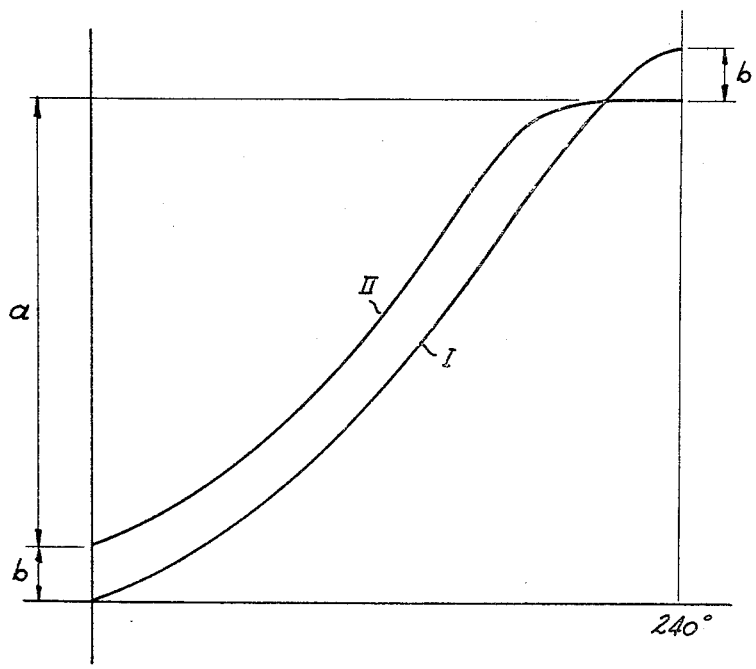
FIGURE 4 is a diagram illustrating the operation of the device conforming to the present invention.

The operation of the damping device described above can be illustrated by the graph of FIGURE 4, in which: $a$ represents the width between the selvedges of the knitted fabric which has been made; $b$ the average headway of an active yarn guide on the corresponding slurcam; curve I, the velocity of the slurcam-rod and curve II, the velocity of an active carrier-rod, time being expressed by the rotation of the sinking cam and drawn in abscissa. The curves I and II are parallel from the origin up to the upper part of curve II where the latter bends down to the horizontal.

Due to the controlled displacement of the stops 19 and 20 and their supports 23 and 24, a very efficient braking effect of box 14 is obtained as well as an extremely accurate temporary standstill of the yarn guides at each end of the throw, whereby the qualities of this braking effect and this standstill are retained independently of the knitting pattern.

It is quite evident that many alterations can be applied not only to the constituent elements of the device according to the present invention but also to their relative arrangements, without exceeding the scope of the invention.

I claim:
1. A damping device for a friction box of a knitting machine having a main cam shaft, a slurcam, carrier rods, a driven sinking cam, a friction rod driving said slurcam, and means driven by said sinking cam and driving said friction rod, said friction rod reciprocating along a straight line, said friction box being carried by said friction rod and driving said carrier rods, said damping device comprising two adjustable stops located on opposite sides of said friction box and adapted to be selectively engaged by said friction box, two supports, separate shafts carried by each support and rotatably mounted therein, each of the last-mentioned shafts carrying one of said stops, gear wheels carried by ends of the last-mentioned shafts, vertically movable racks meshing with said gear wheels, rollers rotatably mounted on said racks, a cam alternately engaging said rollers, and means connected with the first-mentioned means and actuating the last-mentioned cam whereby the last-mentioned cam is driven at the same speed and in the same direction as said friction rod, the last-mentioned cam by engaging a roller displacing the rack carrying that roller and causing an angular displacement of the corresponding stop.

2. A damping device in accordance with claim 1, wherein the first-mentioned means comprise a step-up device driving said friction rod.

3. A damping device in accordance with claim 1, wherein the last-mentioned cam comprises two profiled slots engaging said rollers.

4. A damping device in accordance with claim 3, wherein each of said profiled slots slopes relatively to the horizontal plane at an angle ranging between 30° and 50°.

5. A damping device in accordance with claim 3, wherein said cam including said slots has an anchor-like profile.

References Cited

UNITED STATES PATENTS

| | | | |
|---|---|---|---|
| 1,750,017 | 3/1930 | Meyer et al. | 66—130 |
| 2,043,214 | 6/1936 | Schmidt | 66—130 |
| 3,050,969 | 8/1962 | McCarthy | 66—130 |

FOREIGN PATENTS

| | | |
|---|---|---|
| 443,209 | 4/1927 | Germany. |

ROBERT R. MACKEY, *Primary Examiner.*